US005493644A

United States Patent [19]
Thayer et al.

[11] Patent Number: 5,493,644
[45] Date of Patent: Feb. 20, 1996

[54] POLYGON SPAN INTERPOLATOR WITH MAIN MEMORY Z BUFFER

[75] Inventors: Larry J. Thayer, Fort Collins; Leon Sigal, Denver; Charles R. Dowdell, Fort Collins, all of Colo.

[73] Assignee: Hewlett-Packard Company, Palo Alto, Calif.

[21] Appl. No.: 728,423

[22] Filed: Jul. 11, 1991

[51] Int. Cl.$^6$ ................................................ G06F 15/16
[52] U.S. Cl. ...................... 395/163; 395/162; 395/164; 395/122
[58] Field of Search ................................ 395/162–166, 395/119–122, 133–143; 345/185

[56] References Cited

U.S. PATENT DOCUMENTS 4,967,392  10/1990  Werner et al. ........................... 364/900
5,046,023   9/1991  Katsura et al. ......................... 395/162

OTHER PUBLICATIONS

IEEE Computer Graphics & Applications, "Superworkstation, The Silicon Graphics 4D/240 TX Superworkstation", by Kurt Akeley, Jul. 1989, pp. 71–83.
Akeley et al., "High–Performance Polygon Rendering", Computer Graphics, vol. 22, No. 4, Aug. 1988, pp. 239–246.
Apgar et al., "A Display System for the Stellar™ Graphic Supercomputer Model GS1000™", Computer Graphics, vol. 22, No. 4, Aug. 1988, pp. 255–262.
A. C. Barkans, "High Speed High Quality Antialiased Vector Generation", Computer Graphics, vol. 24, No. 4, Aug. 1990, pp. 319–326.
Deering et al., "The Triangle Processor and Normal Vector Shader: A VLSI System For High Performance Graphics", Computer Graphics, vol. 22, No. 4, Aug. 1988, pp. 21–30.
Swanson et al., "A Fast Shaded–Polygon Renderer", Computer Graphics, vol. 20, No. 4, Aug. 1986, pp. 95–101.
Torborg, "A Parallel Processor Architecture for Graphics Arithmetic Operations", Computer Graphics, vol. 21, No. 4, Jul. 1987, pp. 197–204.
Intel i860 Programmers Reference Manual, pp. 6–22–6–31.
D. Kirk et al., "The Rendering Architecture of the DN10000VS", Apollo Systems Division of Hewlett–Packard, Chelmsford, MA, pp. 1–9.
R. Horning et al., "System Design for a Low Cost PA–RISC Desktop Workstation", Hewlett–Packard Company, Fort Collins, CO, pp. 1–6. IEEE Comput. Soc. Press, Feb. 25–Mar. 1, 1991.

*Primary Examiner*—Raymond J. Bayerl
*Assistant Examiner*—Kee M. Tung

[57] ABSTRACT

A scan converter incorporating a polygon span interpolator with main memory Z buffering. The span interpolator is initiated by instructions from a central processing unit (CPU), and when initiated, the span interpolator inerpolates input color and Z values in parallel. The span interpolator has its own state machine and can, once initiated, operate independent of the clock states of the CPU so that the CPU may process other data. Also, rather than using a dedicated memory as the Z buffer, the Z buffer shares main memory with the CPU. This allows the CPU to send pretranslated initial Z buffer addresses to the span interpolator when the span interpolator is initiated. Subsequent Z buffer addresses and color data addresses may be calculated in parallel with the input color and Z interpolations. Also, since the successive main memory and graphics addresses are known by the software, the memory controller of the invention allows data to be moved directly from main memory to the graphics address without CPU intervention and without having to pass the data through the data caches of the CPU. This greatly improves data transfer efficiencies since the cache penalties present in prior art software scan converters are not present.

17 Claims, 5 Drawing Sheets

POLYGON SPAN INTERPOLATOR WITH MAIN MEMORY Z BUFFER

BACKGROUND OF THE INVENTION

1. Field of the Invention

The present invention relates to a system for accelerating polygon scan conversion using a polygon span interpolator with main memory Z buffering, and more particularly, to a scan converter having a polygon span interpolator which uses main memory Z buffering in order to reduce costs while maintaining processing efficiency. Processing efficiency is maintained by implementing the polygon span interpolator as special free-running hardware responsive to special instructions from the CPU of the system.

2. Description of the Prior Art

Over the last several years, increasingly faster and less expensive computer graphics workstations have become available. Not surprisingly, this trend has contributed to a fast-growing market for workstations and related equipment. The focus of most of the attention by designers of such workstations has been improved price-performance ratios of the worstation's central processing units (CPU's) for general-purpose applications. However, other research efforts have been made to increase the graphics capabilities of such workstations by adding special-purpose graphics hardware. For example, Swanson et al. describe a VLSI device for accelerating the rendering of polygons in a graphics subsystem in an article entitled "A Fast Shaded-Polygon Renderer", *Computer Graphics*, Vol. 20, No. 4, August 1986, pp. 95–101. Torborg has explained in an article entitled "A Parallel Processor Architecture for Graphics Arithmetic Operations", *Computer Graphics*, Vol. 21, No. 4, July 1987, pp. 197–204, how parallel graphics arithmetic processors could be added to a workstation to enhance performance of the geometry portion of the graphics pipeline. Akeley et al. described in an article entitled "High-Performance Polygon Rendering", *Computer Graphics*, Vol. 22, No. 4, August 1988, pp. 239–246, a special graphics accelerator which can draw 100,000 quadrilaterals per second. Deering et al. described in an article entitled "The Triangle Processor and Normal Vector Shader: A VLSI System For High Performance Graphics", *Computer Graphics*, Vol. 22, No. 4, August 1988, pp. 21–30, a design for accelerating polygon rasterization with Phong shading. In addition, A. C. Barkans described in an article entitled "High Speed High Quality Antialiased Vector Generation", *Computer Graphics*, Vol 24, No. 4, August 1990, pp. 319–326, a VLSI device which speeds the drawings of anti-aliased lines. Typically, the above-described devices are attached to the host CPU to provide a level of performance which could not be achieved by using the CPU alone to do the graphics calculations. However, while such hardware add-ons have the advantage that almost any host CPU can support them, they significantly increase the price of the graphics system. It is desirable that such performance enhancements be made possible without the associated cost increases.

A more general-purpose approach has been demonstrated by Apgar et al. in an article entitled "A Display System for the Stellar™ Graphic Supercomputer Model GS1000™", *Computer Graphics*, Vol. 22, No. 4, August 1988, pp. 255–262, and with respect to the HP/Apollo DN100000VS computer, in which graphics needs were considered in the overall design. These systems, sometimes called "super workstations", were crafted with an understanding of both the computational and the graphics needs of high-end users. For example, multiple central processing unit capabilities were included in both workstations. In the case of the Stellar™ system, data movement and internal rendering capability are key to its performance. The HP/Apollo system, on the other hand, added both floating-point capability (based on an analysis of graphics geometry code) and advanced rendering capabilities such as texture mapping and quadratic interpolation. Both superworkstations deliver graphics performance exceeding 100,000 polygons/second, but such systems are only available in the price range of high-end users. Less expensive alternatives are desired.

While the above-described systems solve specific application problems, they do not address the broad range of problems faced by most workstation users. A more general method is to approach the CPU design based on scalable graphics performance. One way to scale performance is to partition the graphics pipeline between what is implemented in the host CPU and what is implemented in specialized graphics hardware. Such partitioning is not the same for all applications. Since specialized hardware can, in general, perform a function more efficiently than a general-purpose CPU by off-loading some of the processing from the CPU (although at added expense), a tradeoff for each specific application is needed.

FIG. 1 illustrates a simplified graphics pipeline 100 and the implementation of key components. As shown, user data is stored in the workstation's virtual memory space as application database 102, typically in the form of a display list such as a hierarchical database consisting of basic graphics primitives such as lines and polygons. The first step in the rendering (drawing) process is to take user-specified viewing coordinates and apply those to the graphics primitives in geometry processor 104, where the image can be moved, zoomed, rotated, and clipped as desired. Scan converter 106 then takes the transformed and clipped vertices and converts them into screen-coordinate pixels for display. For example, in the case of lines, a series of pixels is drawn between the two end points. The graphics image is then stored in a special purpose memory such as an image buffer or frame buffer 108. Finally, the image stored in the image buffer 108 is displayed on display device 110, which is refreshed with a video stream from the image buffer 108. Typically, a color look-up table or color map is also placed between the image buffer 108 and the display device 110 for converting the frame buffer values into the colors to be displayed.

As will be apparent from the following description, the present invention is particularly directed to improvements in the scan converter 106 of the graphics pipeline 100 which allow for an optimized price—performance ratio.

Generally, existing scan conversion systems are of two types: hardware and software. For example, FIG. 2 illustrates a prior art scan conversion system 200 comprised of dedicated hardware. Such a scan converter takes the processed data from geometry processor 104 and separately interpolates the Z coordinate (depth) values and the color values for each point to be displayed on the display screen. In particular, the Z coordinate data is interpolated by Z interpolator 202 and cached in Z cache 204 for storage in dedicated Z buffer 206, which is typically a DRAM. On the other hand, the color data is interpolated in color interpolator 208 and cached in pixel cache 210 for storage in frame or image buffer 212 for subsequent display. In accordance with conventional techniques, the Z coordinate value corresponding to an input pixel is compared to the corresponding Z buffer value in order to determine whether the current pixel is closer to the viewer and is to be shown. If the current pixel is closer to the viewer, the new Z coordinate value is stored in the Z buffer 206 while the corresponding color data is passed along to the frame buffer 212 for display.

Although such a hardware scan conversion system operates quite efficiently, it does so at added expense to the computer components of the scan converter 200 significantly increase the cost of the computer graphics system. In addition, although such a dedicated Z buffer 206 typically eliminates the need to conduct the expensive, slow and complicated process of virtual direct memory access (VDMA) for Z buffering, the scan converter 200 must instead anticipate where data is coming from since it has no predictable virtual direct memory access path. The resulting system is thus expensive, somewhat complicated and without the flexibility of virtual direct memory access systems.

FIG. 3 illustrates a prior art software scan conversion system 300. As shown, a special purpose processing chip may be programmed to perform the scan conversion function. For example, the illustrated Intel i860 processor 302 is a graphics unit which may be programmed to process 3D graphics drawing algorithms as well as operations such as pixel shading and hidden surface elimination using a Z buffer. During operation, i860 processor 302 processes the data from the applications database (main memory 304) to perform geometric transformations, color interpolation and Z buffer adds and interpolation. The i860 processor 302 also uses scan conversion software responsive to the CPU clock states to perform the interpolations and the like. In particular, interpolation is performed under software control during respective clock states of i860 processor 302, thereby preventing the CPU from performing other calculations. As shown, Z buffer 306 is incorporated into main memory 304. The scan converted data is then passed to frame buffer 308 for display.

Although the system of FIG. 3 minimizes the use of dedicated hardware and is thus relatively inexpensive, the performance of such a software scan conversion system is limited because the CPU must perform all processing. It is desired to provide similar functionality without typing up the graphics processing unit to perform interpolation, VDMA and Z buffer compares.

Accordingly, an improved scan conversion technique is desired in which the processing speed and accuracy of hardware scan converters can be maintained while maintaining the cost effectiveness of a software scan conversion system. The present invention has been designed for this purpose.

SUMMARY OF THE INVENTION

The objects of the present invention have been met by providing a system and method for accelerating polygon scan conversion using a polygon span interpolator with a main memory Z buffer. Main memory is used for Z buffering to keep costs down, and since special free-running hardware is used for scan conversion system of FIG. 3, improved speed is also possible. Also, as in prior art devices, the old Z buffer values may be compared to the new Z value by reading the corresponding old Z value from main memory. The result of the comparison may then be used to determine whether the new Z value is to be written to main memory and whether the pixel colors for the current pixel are to be sent to the frame buffer. The result is a very low cost 3D graphics accelerator system for shaded, Z buffered polygons.

In particular, the objects of the invention are implemented in a system for manipulating data for display on a display device. Such a system in accordance with a preferred embodiment of the invention preferably comprises a memory for storing data to be displayed, a processing unit for processing the data at respective clock states thereof, and memory controller means responsive to the processing unit for selectively accessing the data in the memory. Preferably, the memory controller means includes a free running processor whose processes are initiated by the processing unit but which processes predetermined coordinate data from the processing unit independent of the clock states of the processing unit and stores the processed predetermined coordinate data in a predetermined portion of the memory. A preferred embodiment of the invention further comprises a frame buffer connected to an output of the memory controller means. The free running processor also preferably comprises means for interpolating the predetermined coordinate data and input color data for each pixel to be displayed and means for calculating, in parallel with interpolation by the interpolating means, addresses for storage of the interpolated predetermined coordinate data in the predetermined portion of the memory and of the input color data in the frame buffer.

In accordance with another aspect of the invention, the memory controller means further comprises means for transferring blocks of data stored in the memory to and from the frame buffer without passing the data through the processing unit. Such block moves allow data to be moved between memory and the frame buffer without the overhead of going through the CPU.

In a preferred embodiment of the invention, the system is included in a computer graphics workstation for display of manipulated graphics data. In such an embodiment of the invention, the processing unit preferably provides an instruction to the memory controller means instructing it to flush data in a data cache of the main memory to the main memory prior to a memory access by the memory controller means when the desired data is in the data cache, provide physical addresses to data to be accessed in the main memory by the memory controller means and to initiate interpolation by the free running span processor of respective data points on a span of the processed graphics data. As used herein, such a span extends up to the width of a polygon in a given scan line.

In a preferred embodiment of the invention, the predetermined coordinate direction corresponds to a Z direction perpendicular to a display screen of the graphics display device and the predetermined portion of the main memory comprises a Z buffer for storing old Z values. In such an embodiment, the memory controller means further comprises means for comparing the old Z values to processed Z values from the free running span processor in accordance with typical Z buffering techniques.

The scope of the invention further includes a method of manipulating data for display on a display device. A preferred embodiment of such a method comprises the steps of:

storing input data in a main memory;

geometrically transforming the input data in response to respective clock states of a processing unit;

initiating scan conversion of the geometrically transformed input data in a free running span processor in response to an instruction from the processing unit;

selectively accessing the data in the main memory with the free running span processor independent of the clock states of the processing unit;

comparing accessed Z coordinate data with input Z coordinate data from the processing unit;

outputting for display on the display device either the pixel data for the accessed Z values or the pixel data corresponding to the input Z coordinate data as a result of the comparison in the comparing step; and updating the Z coordinate data to a predetermined portion of the main memory in accordance with the comparison in the comparing step.

Such a method preferably comprises the further steps of interpolating the input Z coordinate data and input color data for each pixel to be displayed and, in parallel with the interpolating step, calculating addresses for storage of the interpolated input Z coordinate data in the predetermined portion of the main memory and of the interpolated input color data in a frame buffer. Preferably, the method of the invention also includes the further step of transferring data stored in the main memory to and from the frame buffer without passing the data through the processing unit.

The objects and advantages of the present invention will become more apparent and more readily appreciated from the following detailed description of the presently preferred exemplary embodiment of the invention taken in conjunction with the accompanying drawings.

DETAILED DESCRIPTION OF THE PREFERRED EMBODIMENT

Figure 1:
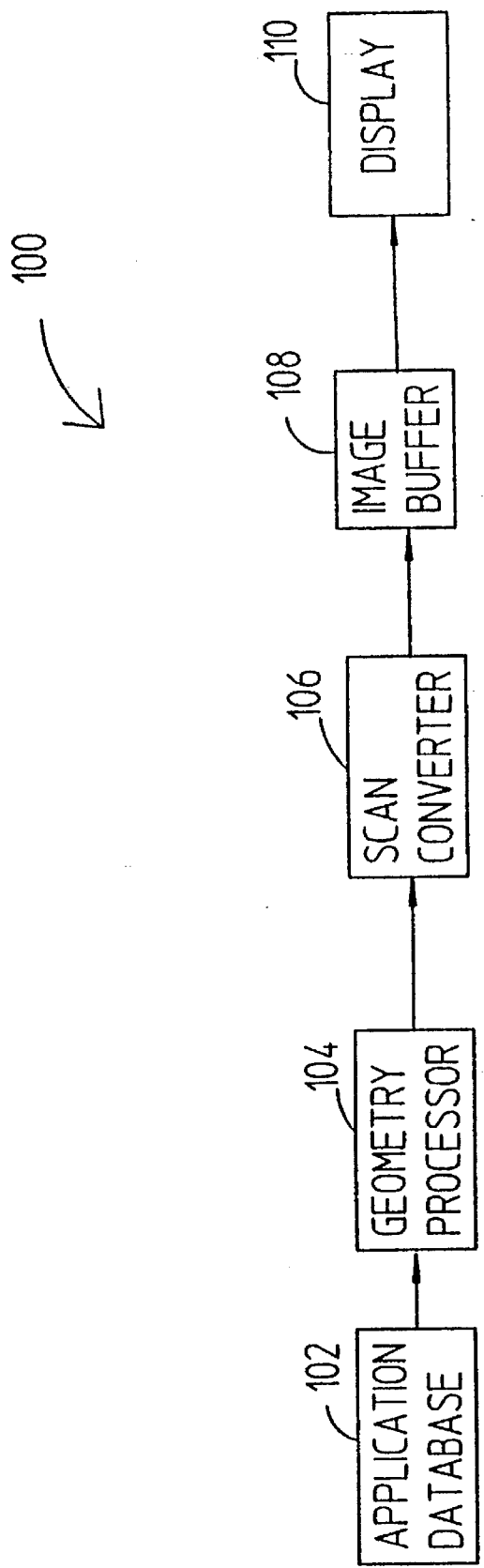
FIG. 1 illustrates the key components of a graphics pipeline.
Figure 2:
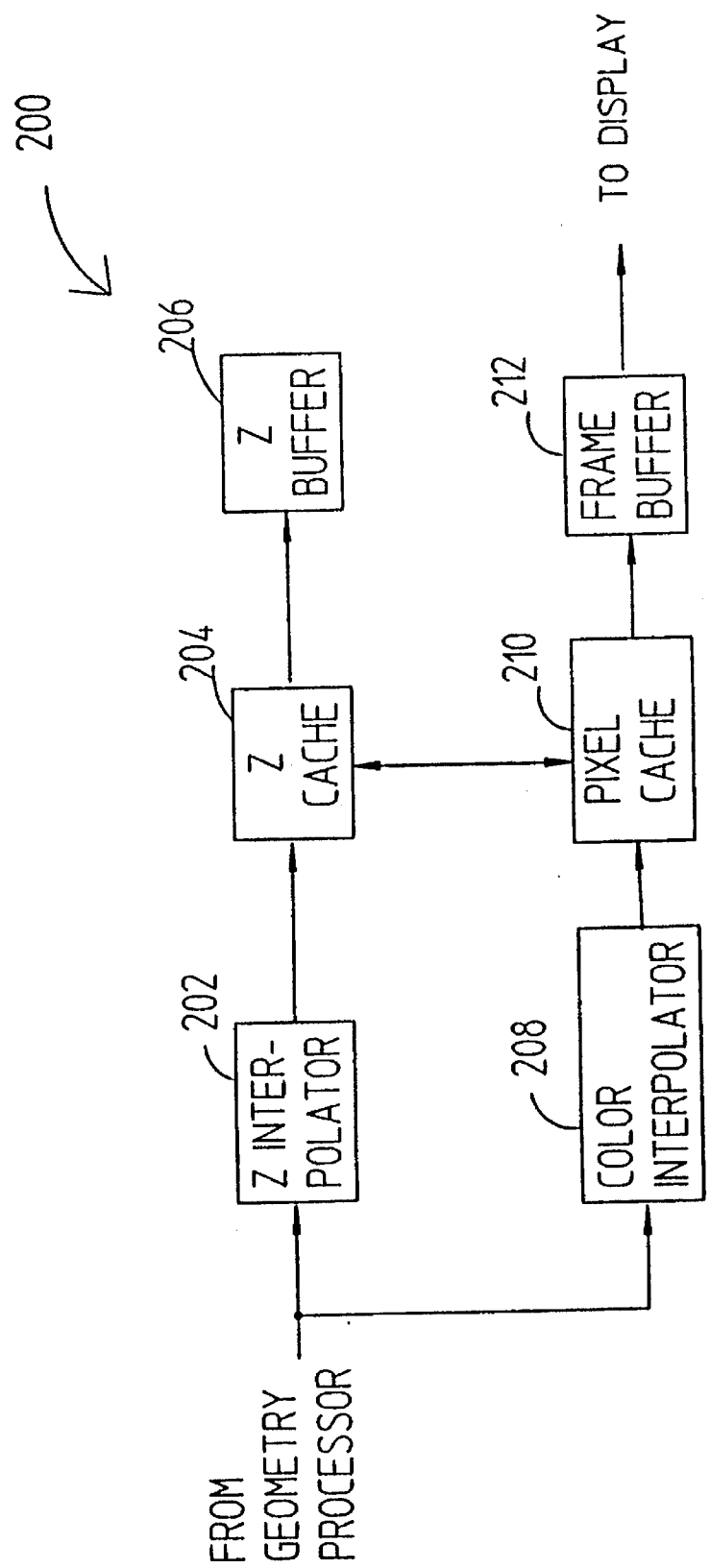
FIG. 2 illustrates a hardware scan conversion system of the prior art in which the Z buffer is implemented using dedicated hardware.
Figure 3:
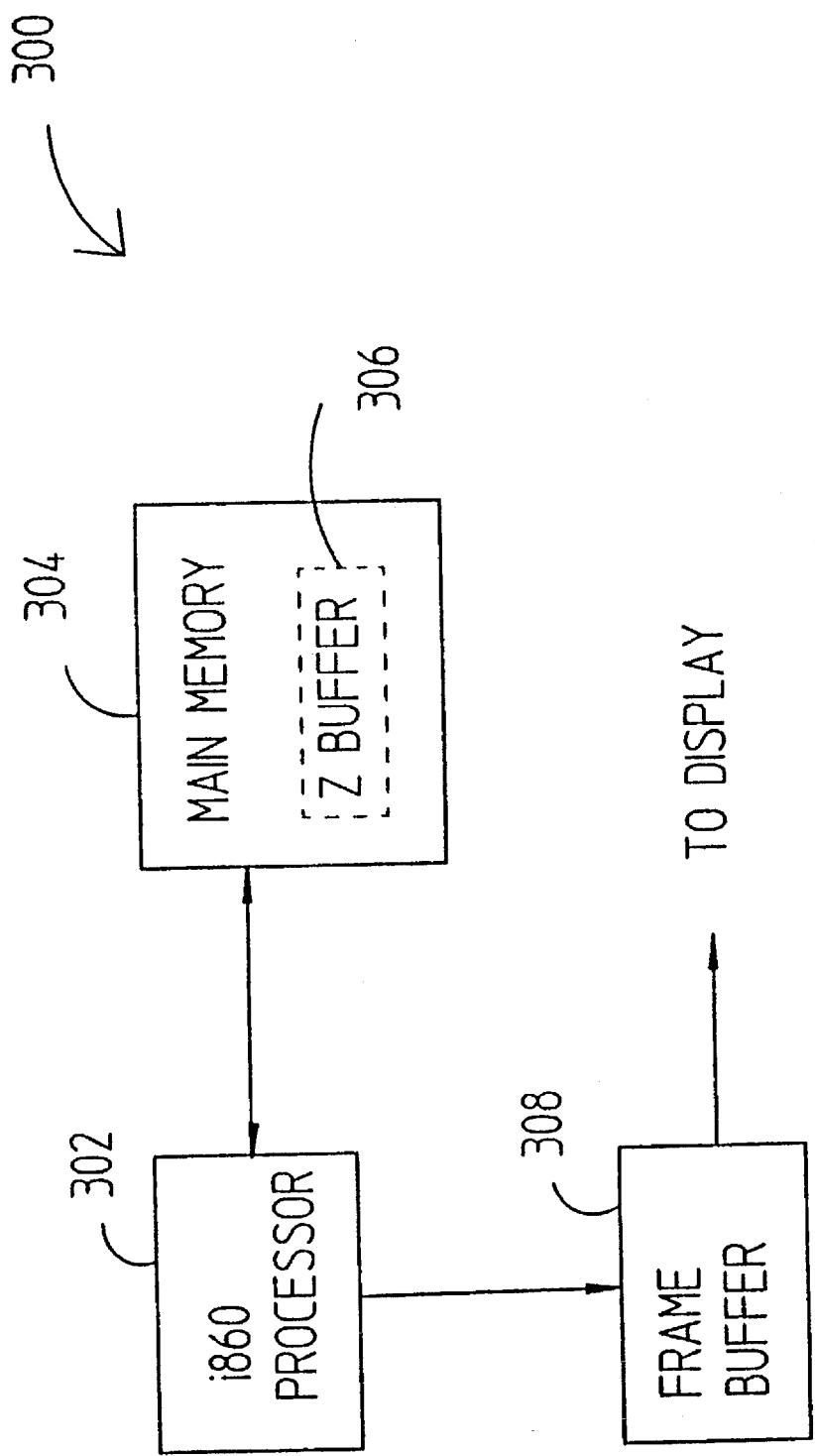
FIG. 3 illustrates a software scan conversion system of the prior art in which a specially programmed graphics unit runs a software scan conversion routine which implements the Z buffer in main memory.

The inventors of the subject matter disclosed and claimed herein have satisfied the above-mentioned needs in the art by developing a scan conversion system which implements a span interpolator in a memory controller which runs independent of the CPU of the graphics unit and which directly accesses a Z buffer stored in main memory for Z buffering. A process and apparatus with these and other beneficial features in accordance with a presently preferred exemplary embodiment of the invention will be described below with reference to FIGS. 4 and 5. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

The technical considerations leading to the invention will first be described by way of background, and then the invention will be described with respect to FIGS. 4 and 5.

The present inventors have recognized that by removing any identifiable data flow bottleneck while at the same time developing a functional model for the data flow which fits well within a graphics system context, efficiency of movement of data within the system may be maximized. However, the characteristics of such a system are constrained by the requirements of both the virtual memory and processor cache systems as well as the need to minimize the impact which graphics data flow imposes upon other system elements which share the data pathways. The present invention thus has been designed to maximize the efficiency of the movement of data between the virtual memory system and the graphics system and the movement of data from the virtual memory system to the CPU. Improvements made in the realizable bandwidth of such data paths affect many aspects of graphics performance, as will be apparent from the following description.

The most direct way of performing a data transfer has been to move the data under program control through the CPU's execution unit. In addition to the inherent simplicity, there are several other functional characteristics of this method. For example, virtual address to physical address translation is transparent to the software. In addition, cache coherency is maintained in a software transparent manner, since data is first moved from memory to the cache and then subsequently moved from the cache to the I/O channel. The entire data transfer process may be defined by user-level software so that no call to the operating system or driver code is required. The system data paths may also be accessed on a word rather than block basis so that other transfers are not held off for long periods of time.

However, it has been difficult to achieve the necessary graphics bandwidth requirements by moving data through the execution unit of the CPU. In addition, moving large amount of graphics data through the data cache has been found to have a significant impact on system performance, for large amounts of application data are thereby displaced from the cache. Something else has been needed to drive the data transfer.

Since the memory controller section of conventional CPUs can move data between a 32-byte block of physical memory and a 32-bit I/O channel, the present inventors have determined that a MOVE instruction could be added to the CPU's software which performs the translation between a specified virtual address and a corresponding physical address. Such a translation may use the processor's translation lookaside buffer with standard exception handling and protection mechanisms operative. In addition, if a processor data cache line contains data which represents the data at the specified virtual address, and the cache line is dirty, the cache line may be automatically flushed to memory. The physical address may then be forwarded to the memory controller section which then begins the 32-byte transfer. Such an instruction thereby provides the user of the graphics CPU with an instruction which greatly improves data transfer rates and which retains all of the advantages of the data transfer method described above, including the simplicity. Moreover, since data is not moved through the processor's data cache, no application data is displaced. Using such an instruction, the write to the graphics system using CPU load/store instructions are no longer necessary, thereby saving much processing time.

Moving large blocks of data directly using a memory controller is an effective means of providing display file data to a two dimensional or three dimensional geometry pipeline. However, system configurations which require the CPU to perform arithmetic processing of display file data must move data from the virtual memory system into the CPU's register file. The process of accessing large display filed from virtual memory for processing by the CPU is unique in several ways. Typical display files are larger than most system caches, while at the same time the data within the display file is typically used just once. Given this set of characteristics, the system cache is just about useless. In modern processors, cache miss penalties also can be high due to increasingly high processor clock rates. Reducing the number of data cache misses therefore complements any improvements made in the arithmetic processing capabilities of the CPU. However, as the processing overhead is reduced, the data access overhead becomes a larger percentage of the total execution time.

Fortunately, display files have a third characteristic. Namely, display file access patterns are often sequential or are otherwise easy to predict by the software. Thus, if the software could indicate to the CPU that it will be requiring a particular data set to be present in cache soon, cache miss penalties could be reduced dramatically. The present inventors thus have created a new LOAD instruction which requests the memory controller to fetch 32 bytes at a specified virtual address and to place them in the data cache. While the data is being fetched, the CPU is free to continue executing instructions. If no attempt is made to access the specified data before it has been placed in cache, then no cache miss penalty is incurred.

The present inventors have discovered that by modifying a graphics CPU to include the above-mentioned MOVE and LOAD instructions scan conversion may be conducted independent of the other processing by the CPU. This aspect of the invention will be described in more detail below with respect to FIGS. 4 and 5.

For display of shaded, Z buffered polygons representing 3-dimensional images, a user database is stored in virtual memory as basic primitives such as polygons and parametric surfaces such as B splines. Geometry operations include operations to model light reflecting from the surfaces so that the objects appear solid. Some lighting operations include the modeling of shiny (specular) surfaces with directional, point and spot lights. However, the scan conversion process for rendering such solids is quite sophisticated. First, color interpolation is necessary to make the surface of the object appear smooth. Also, hidden surface removal is necessary to ensure that only the closest surface at any particular point is displayed to the viewer. The present inventors have found that these features of a graphics system may be inexpensively incorporated into a graphics CPU by using modifications of the above-mentioned MOVE and LOAD instructions. Such features of the invention also will be described in more detail below with respect to FIGS. 4 and 5.

Figure 4:
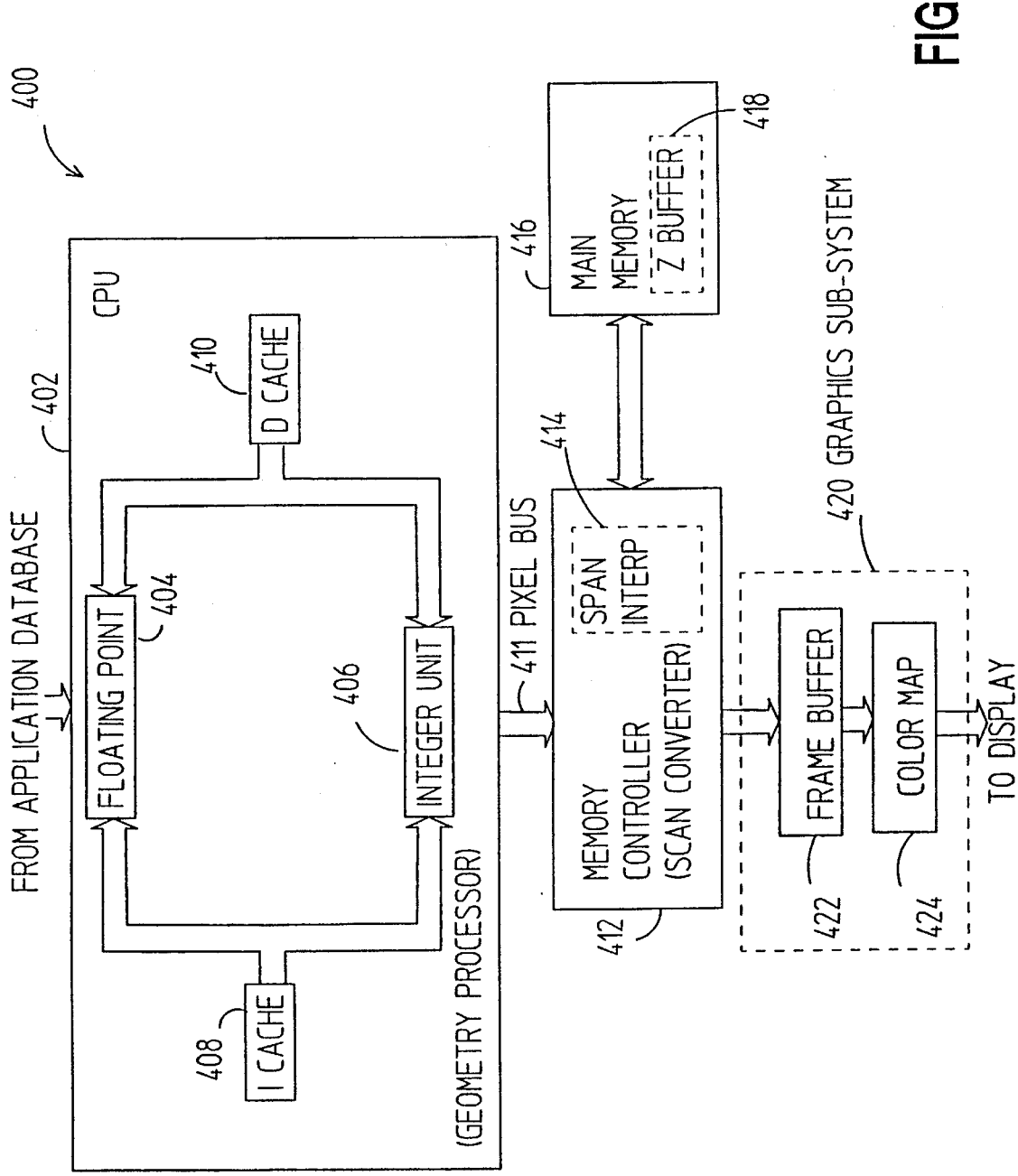
FIG. 4 illustrates a scan conversion system in accordance with a preferred embodiment of the invention.
Figure 5:
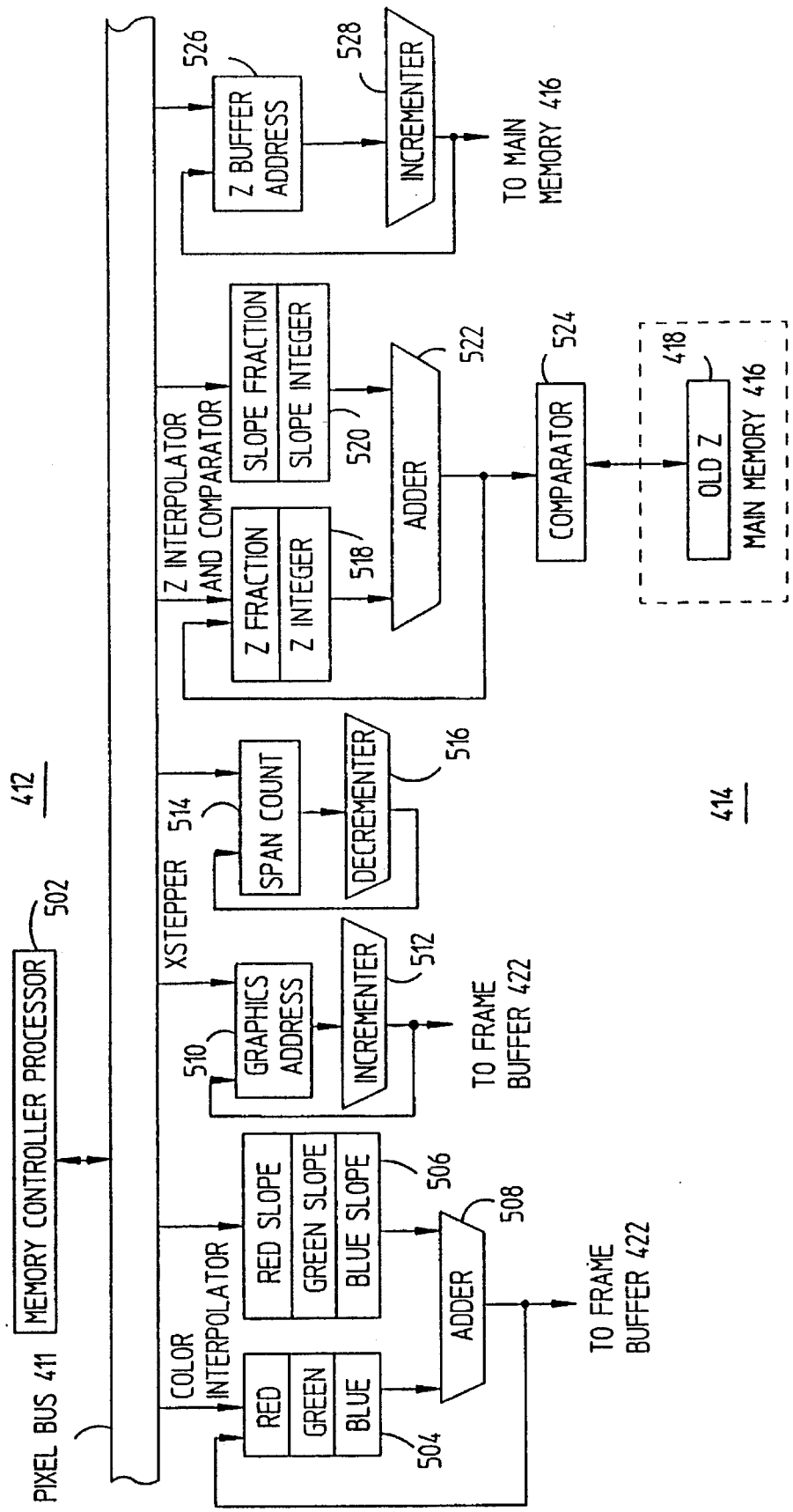
FIG. 5 illustrates a preferred embodiment of span interpolator 414 of the scan conversion system of FIG. 4.

As shown in FIG. 4, the scan conversion system 400 of the invention comprises a CPU 402 having a floating point unit 404 and an integer unit 406 for processing data received from instruction cache 408 and data cache 410. CPU 402 preferably performs conventional 3-dimensional solid rendering processing such as performed in conventional geometry processors and outputs the resulting color and coordinate data onto a pixel bus 411. The processed data on processor bus 411 is then received by memory controller 412, which performs scan conversion in accordance with the techniques of the invention. Preferably, memory controller 412 includes span interpolation circuitry 414 of the type shown in more detail in FIG. 5. Span interpolation circuitry 414 has been added to the memory controller 412 to do color interpolation on red, green, and blue data independently and to do hidden surface removal and high-speed pixel writing to the frame buffer. Since CPU 402 typically can generate pixels at rates of over 15 million pixels per second, such rates are generally sufficient for many interactive 3-dimensional solids applications. Memory controller 412 also communicates directly with main memory 416 for performing Z buffering using a portion 418 of main memory 416 and for performing block data moves as will be described in more detail below. The processed color pixel data may then be passed to a graphics subsystem 420, which preferably includes frame buffer 422 and color map 424, before being output for display.

One of the goals in designing the system of FIG. 4 was to approximate the polygon rendering performance of an entry-level 3-dimensional system while using only an inexpensive frame buffer. This meant that the CPU would have to implement the entire graphics pipeline, including polygon scan conversion. A prototype of the scan conversion software was thus developed using the existing instruction set of the CPU. The scan conversion software interpolated each of the red, green and blue data and Z coordinate data, performed Z comparisons and conditional Z writes using a Z buffer implemented in main memory and then performed the conditional writes of the red, green, and blue data to the frame buffer. However, it was found by the present inventors that such a system would not be effective unless there were some parallelism between the polygon span setup and the polygon span processing as well as some parallelism in the inner loop of the span processing software itself. Data cache thrashing was also found to be a problem since the Z buffer data displaced useful data in the cache.

Several new CPU instructions were then considered to improve parallelism. However, the present inventors determined that the CPU's execution unit would not provide the parallelism required to significantly improve scan conversion performance. Instead, it was decided that the memory controller section would need to be enhanced to provide the inner loop processing across an entire horizontal span (left edge to right edge along a scan line) of an input polygon, thereby leaving the CPU execution unit free to perform the edge stepping and span setup process for processing input polygons in accordance with the techniques described by way of example in related U.S. patent applications Ser. Nos. 07/493,185, filed Mar. 14, 1990 and entitled "Accelerated Decomposition of Small Polygons Into Trapezoids"; 07/494,292, filed Mar. 16, 1990 and entitled "Decomposition of Arbitrary Polygons Into Trapezoids"; and 07/669,150, filed Mar. 12, 1991 and entitled "A Polygon Renderer For A Computer Graphics System".

Moving the inner loop processing into the hardware of memory controller 412 allows red, green, blue and Z interpolation as well as data formatting to be performed in parallel in accordance with the techniques of the present invention. The memory access method of the invention was built on top of the MOVE instruction hardware described above by allowing the memory controller 412 to read 32 bytes from physical memory into an internal buffer of the memory controller 412. The contents of the internal buffer are then compared with the interpolated Z values, modified appropriately, and written back to the Z buffer 418 in physical memory. In parallel with the Z processing, the red, green, and blue values are interpolated across the span and are conditionally written to the graphics system over a 32-bit I/O connection to frame buffer 422. Data cache thrashing due to the Z buffer access is eliminated since the Z buffer data is never moved through data cache 410 of CPU 402.

Mapping the Z buffer 418 into the virtual memory space of the main memory 416 shared by the CPU 402 also eliminates the need to allocate a section of physical memory at boot time, allowing the Z buffer 418 memory to be used for other purposes when the Z buffer 418 is not in use. In order to accomplish this and to control the span processing hardware, a new interpolate instruction (INTERPOLATE) was created which behaves very much like the MOVE instruction described above. Both virtual to physical address translation as well as the cache coherency check are performed just as for the above-described MOVE instruction. The physical memory address is then forwarded to the memory controller 412. Each issuance of the INTERPOLATE instruction will cause either 8 or 16 pixels to be rendered, depending upon whether a 24 bit or 16 bit Z buffer 418 has been selected by the scan conversion software. Also, in order to improve translation lookaside buffer hit rates, a 2-dimensional Z buffer region 418 may be mapped to each virtual page.

The above-described Z buffering is preferably operated under the control of span interpolator 414. Span interpolator 414 is setup by CPU 402 using the afore-mentioned LOAD instruction. Then, when an INTERPOLATE instruction is received, color values and Z coordinates and the like are received and processed in parallel as shown in FIG. 5. In other words, the LOAD instruction from the CPU 402 initiates the span interpolator 414 so that it may run independent of the clock states of CPU 402. Then, when an INTERPOLATE instruction is received from CPU 402, the process of determining the graphics address, Z buffer address, interpolated color and interpolated Z buffer components are all performed in parallel as will be described below with respect to FIG. 5. This processing is performed without dedicated memory since the Z buffer 418 may share main memory 416 with CPU 402. As a result of such memory sharing, the Z buffer address may be pretranslated from its virtual to physical address and may be directly accessed by the span interpolator 414. Also, data may be moved in blocks directly from main memory 416 to a graphics address in graphics sub-system 420 without having to pass through the CPU 402, thereby preventing the use of CPU clock states for cache loading and storing.

The present invention may be simply implemented by modifying CPU 402 to handle setup of the memory controller 412 of the invention. In particular, CPU 402 is modified to output load register (LOAD) and INTERPOLATE commands which are received by the memory controller processor 502 of span processor 414 shown in FIG. 5. Memory controller processor 502 then proceeds in accordance with its state machine to set up each span and to calculate the starting address values for the next span. A preferred embodiment of such a span interpolator state machine is as follows (in C processing language):

```
case present_state:
{
IDLE:
        {
        if (input_command = LOAD) next_state = LOAD
REGISTER:
        if (input_command = INTERPOLATE) next_state =
INTERPOLATE;
        }
LOAD_REGISTER:
        {
        case (input_command)   {
            LOAD_RED:
                set red_register;
            LOAD_GREEN:
                set green_register;
            LOAD_BLUE:
                set blue_register;
            LOAD_RED_SLOPE:
                set red_slope_register;
            LOAD_GREEN_SLOPE:
                set green_slope_register;
            LOAD_BLUE_SLOPE:
                set blue_slope_register;
            LOAD_Z_INTEGER:
                set z_integer_register;
            LOAD_Z_FRACTION:
                set z_fraction_register;
            LOAD_Z_SLOPE_INTEGER:
                set z_integer_register;
            LOAD_Z_SLOPE_FRACTION:
                set z_fraction_register;
            LOAD_GRAPHICS_ADDRESS:
                set graphics_address;
            LOAD_SPAN_COUNT:
                set span_count;
            USER_CONTROL:
                set user_control;
            Z_BUFFER_ADDRESS:
                set z_buffer_address;
            next_state IDLE:
        }
        }
INTERPOLATE:   {
        get NEXT_MEMORY:
        next_state = STATE1;
        }
STATE1:     {
        compare CURRENT_Z to
        CURRENT_MEMORY:
        if (CURRENT_Z > CURRENT_MEMORY) {
            write CURRENT_Z to memory;
            send CURRENT_RGB address;
        }
        interpolate NEXT_Z address;
        compute NEXT_Z address;
        decrement span_count;
        next_state = STATE2;
        }
STATE2:     {
        IF (CURRENT_Z > CURRENT_MEMORY) {
            send CURRENT_RGB:
        }
        interpolate NEXT_Z integer;
        get NEXT_MEMORY:
        interpolate NEXT_RGB:
        compute NEXT_RGB address;
        if (span_count > 0)    {
            next_state = STATE1;
            else next_state = IDLE:
        }
}
```

The present invention is preferably used with a polygon rasterization system whereby vertices are converted to screen coordinates with color, edge slopes are calculated and the intersections of the edges with the scan lines are determined. A device performing this function is described, for example, in related U.S. patent application Ser. No. 07/669,150 by one of the present inventors. However, the present invention further interpolates the color and the Z coordinates, compares the interpolated Z coordinates with the Z buffer values and then steps along the span in the X direction until the interpolation is completed for all points of each span of the polygon. The span interpolator 414 for performing these functions will now be described in more detail with reference to FIG. 5.

Memory controller 412 preferably includes a memory controller processor 502 responsive to the afore-mentioned LOAD and INTERPOLATE instructions for setting up operation of span interpolator 414. As described above, once these instructions have been received, span interpolator 414 operates independent, and in parallel with, CPU 402 to perform the interpolate function set forth above in the state machine of memory controller processor 502. As shown in FIG. 5, during interpolation the input color values on the pixel bus 411 are input into a color interpolator having color registers 504 and slope registers 506. The corresponding color and slope values for display points are then added in adder 508, and the sum is fed back to color registers 504 to update the color values for the next points on the span. The sum output of adder 508 is also output to frame buffer 422 for display at the appropriate pixel on the display screen. During the color interpolation, an X stepper also calculates the next graphics address in graphics address unit 510 by incrementing in the X direction using incrementer 512 and feeding back this value to graphics unit 510. The corresponding address for each pixel is then used to access the frame buffer 422 in accordance with known techniques. This process continues for each pixel within a span to be displayed (i.e., until span counter 514 indicates that all pixel values on a particular scan line within the polygon have been calculated). This can be determined by decrementing the span count by one point for each pixel calculation or data block moved using decrementer 516 and feeding this value into span count register 514.

In parallel with the above-described color interpolation, the Z interpolation and Z buffer comparison is performed using elements 518 to 528. As shown in FIG. 5, the Z fraction and integer values and slope fraction and integer values are respectively stored in registers 518 and 520 and added in adder 522. The sum is fed back for storage in Z buffer 518 as the updated Z value and is also compared in comparator 524 to the corresponding old Z value stored in Z buffer 418. In accordance with known techniques, if the new Z coordinate is determined to be closer to the viewer than the Z coordinate previously stored in Z buffer 418, the corresponding color values are output to the frame buffer 422 for display to the viewer. Otherwise, the color values are either stored in a different layer of the Z buffer or discarded. The Z buffer address is also calculated using Z buffer address unit 526 and is incremented by incrementer 528 for each respective Z buffer value. The resulting Z buffer address is then used to access main memory 416 in the portion thereof dedicated to Z buffer 418.

Each pixel's value is interpolated by adding a Z integer/fraction slope to a Z integer/fraction. Interpolation is performed in two states as shown in the above span interpolator state machine. During the first state the lower 32 bits are interpolated with the exception of the carry out. During the second state the upper 32 bits are interpolated with the carry in from the first state. The magnitude of Z increases for positive slope and decreases for negative slope.

Interpolation is preferably done on a line (8 words of data). During operation, the input registers of the span interpolator 414 (except Z buffer address unit 526) are initialized from the pixel bus 411. The interpolation is initiated by an INTERPOLATE instruction which also provides the Z buffer address. For each input pixel, the old Z value indicated by the Z buffer address is then fetched from Z buffer 418 in main memory 416. The old Z value is compared to the Z value being interpolated. If the comparison conditions indicated in a user control register are met, the old Z value is updated with the interpolated Z value. Otherwise, the old Z value is preserved. The new Z value is then written back to Z buffer 418. Color interpolation proceeds in parallel with the Z interpolation, and the color values are preferably packed into a single word. This data, along with its graphics address, is sent to the graphics subsystem 420 as previously described.

A word Z buffer address indicates at which pixel within a line of, for example, frame buffer 422 the interpolation begins. The interpolation then proceeds until either one line is processed or the span count indicates a negative value (a polygon edge is reached). Such features of the invention allow the associated graphics workstation to implement true or pseudo color, downstream color dithering, fast clearing of the Z buffer with a constant value, and independent disabling of the Z interpolation, color interpolation or graphics address incrementing.

In accordance with the present invention, CPU 402 gives the span interpolator 414 the main memory address of the Z buffer 418 rather than an implicit XY address as when a dedicated hardware Z buffer is used. CPU 402 also preferably flushes the data cache 410 when initiating the interpolation and supplies the Z buffer address if the Z buffer 418 is in cache. In other words, if the Z buffer 418 is in cache 410, it is moved to main memory 416 to allow access by the span interpolator 414. Such a mechanism prevents lock out of the Z buffer 418. Also, for improved results, the flush to main memory 416 may be driven by a secure process rather than a user provided Z buffer address.

The present invention is also characterized in that the memory controller 412 allows direct communication between the frame buffer 422 and the main memory 416. For this purpose, the above-described MOVE instruction may be implemented in the state machine of the memory controller 412. Since the addresses of both the main memory 416 and frame buffer 422 are known, data transfer may proceed without further intervention or control by CPU 402. However, such a process is preferably implemented as a form of cache flush instruction which allows transfer of a single cache line worth of span and then flushes the data cache 410 after each cache line. This is done by allowing the CPU 402 to interfere with memory controller 412 to flush about every 8 words. Data cache 410 may also be flushed when necessary (as when Z data is cached). Such a flush instruction also may be implemented as a conditional flush for initiating span interpolation and flushing the data cache 410 to main memory as described above.

The present invention thus also provides a block move function between main memory 416 and the graphics subsystem 420. Block moves are preferably done on a line (8 words) of data. First the control, span count, and graphics address registers are initialized from the pixel bus 411. The block move is then initiated by a MOVE instruction which provides the main memory 416 address. A line of data may then by moved between main memory 416 and the graphics subsystem 420. As would be apparent to one of ordinary skill in the art, data movement in either direction is also possible using the same techniques.

Such an ability to transmit data from virtual memory (main memory) 416 to the graphics system is quite desirable, for fonts and background patterns used in X windows are typically stored in virtual memory. A 60 Mbyte/second transfer rate allows such windows to be moved in real time. A data pathway and appropriate pointers allow the memory controller 412 to redirect data to the graphics sub-system 420 when a MOVE instruction is executed. By so including the virtual memory data transfer capabilities in the base processor design, there is no need for a separate VDMA controller. Moreover, including this capability in the memory controller 412 assures that the transfer rates will be optimal. Furthermore, because virtual memory data transfers operate on 32-byte data sets, they are more flexible than VDMA transfers, which typically operate on large sequential data sets.

Those skilled in the art will appreciate than when more graphics performance is needed, a specialized graphic system with multiple processors and specialized VLSI may be added to the workstation. In such a case, graphics subsystem 420 may be a full graphics pipeline, and memory controller 412 may be used to provide block moves between the main memory 416 and the specialized graphics accelerating system. Since the user database is typically stored in main memory 416, memory controller 412 can provide access by the graphics accelerating system to the user database at rates of over 60 megabytes per second. If independent, lighted quadrilaterals are being sent, this rate would correspond to over 500,000 polygons per second, more than enough for even the fastest configuration of current accelerated graphic systems.

Although a single exemplary embodiment of the invention has been described in detail above, those skilled in the art will readily appreciate that many additional modifications are possible in the exemplary embodiment without materially departing from the novel teachings and advantages of the invention. For example, the graphics subsystem 420 also may be replaced by any other suitable I/O device so that the I/O device may be given direct access to the main memory 416. Accordingly, all such modifications are intended to be included within the scope of the invention as defined in the following claims.

We claim:

1. A system for manipulating data for display on a display device, comprising:

a memory for storing data to be displayed;

a processing unit for processing said data at respective clock states thereof; and memory controller means responsive to said processing unit for selectively accessing said data in said memory, said memory controller means including a free running processor whose processes are initiated by said processing unit but which processes predetermined coordinate data from said processing unit independent of the clock states of the processing unit and stores said processed predetermined coordinate data in a predetermined portion of said memory.

2. A system as in claim 1, further comprising a frame buffer connected to an output of said memory controller means, wherein said free running processor comprises means for interpolating said predetermined coordinate data and input color data for each pixel to be displayed and means for calculating, in parallel with interpolation by said interpolating means, addresses for storage of said interpolated predetermined coordinate data in said predetermined portion of said memory and of said input color data in said frame buffer.

3. A system as in claim 1, further comprising a frame buffer connected to an output of said memory controller means, wherein said memory controller means further comprises means for transferring data stored in said memory to said frame buffer without passing said data through said processing unit.

4. A computer graphics workstation for manipulating graphics data for display on a graphics display device, comprising:

main memory means for storing said graphics data;

a processing unit for processing said graphics data at respective clock states thereof; and memory controller means responsive to said processing unit for selectively accessing said graphics data in said main memory means, said memory controller means including a free running span processor whose processes are initiated by said processing unit but which processes predetermined coordinate data independent of the clock states of the processing unit and stores said processed predetermined coordinate data in a predetermined portion of said main memory means.

5. A workstation as in claim 4, further comprising a frame buffer connected to an output of said memory controller means, wherein said free running span processor comprises means for interpolating said predetermined coordinate data and input color data for each pixel to be displayed and means for calculating, in parallel with interpolation by said interpolating means, addresses for storage of said interpolated portion of said memory means and of said input color data in said frame buffer.

6. A workstation as in claim 4, further comprising a frame buffer connected to an output of said memory controller means, wherein said memory controller means comprises means for transferring graphics data stored in said main memory means to said frame buffer without passing said graphics data through said processing unit.

7. A workstation as in claim 4, further comprising a data cache operatively connected to said main memory means for storing data.

8. A workstation as in claim 7, wherein said processing unit includes means for flushing data in said data cache to said main memory means prior to a memory access by said memory controller means when desired data is in the data cache, means for providing physical addresses to data to be accessed in said main memory means by said memory controller means and means for initiating interpolation by said free running span processor of respective data points on a span of said processed graphics data.

9. A workstation as in claim 4, wherein said predetermined coordinate data comprises Z coordinate data corresponding to a Z direction perpendicular to a display screen of said graphics display device and said predetermined portion of said main memory means comprises a Z buffer for storing old Z values, said memory controller means further comprising means for comparing said old Z values to processed Z values from said free running span processor.

10. A computer graphics workstation for manipulating graphics data for display on a graphics display device, comprising:

main memory means for storing said graphics data;

a processing unit for processing said graphics data at respective clock states thereof;

a graphics sub-system for outputting said processed graphics data for display on said graphics display device; and memory controller means responsive to said processing unit for selectively accessing said graphics data in said main memory means, said memory controller means including a free running span processor whose processes are initiated by said processing unit but which processes coordinate data in a predetermined coordinate direction independent of said clock states of said processing unit and stores said processed coordinate data in a predetermined portion of said main memory means, said memory controller means further comprising means for transferring graphics data stored in said main memory means to and from said graphics sub-system without passing said graphics data through said processing unit.

11. A computer graphics workstation as in claim 10, wherein said graphics sub-system comprises a frame buffer.

12. A computer graphics workstation as in claim 10, wherein said graphics sub-system comprises a graphics accelerator system.

13. A method of manipulating data for display on a display device, comprising the steps of:

storing input data in a main memory;

geometrically transforming said input data in response to respective clock states of a processing unit;

initiating scan conversion of said geometrically transformed input data in a free running span processor in response to an instruction from said processing unit;

selectively accessing said data in said main memory with said free running span processor independent of the clock states of the processing unit;

comparing accessed Z coordinate data with input Z coordinate data from said processing unit;

outputting for display on said display device one of said accessed Z coordinate data and said input Z coordinate data as a result of the comparison in said comparing step; and updating the accessed Z coordinate data in a predetermined portion of said main memory in accordance with the comparison in said comparing step.

14. A method as in claim 13, comprising the further steps of interpolating said input Z coordinate data and input color data for each pixel to be displayed and, in parallel with said interpolating step, calculating addresses for storage of said interpolated input Z coordinate data in said predetermined portion of said main memory and of said interpolated input color data in a frame buffer.

15. A method as in claim 14, comprising the further step of transferring data stored in said main memory to said frame buffer without passing said data through said processing unit.

16. A method as in claim 13, wherein said scan conversion initiating step comprises the steps of flushing data in a data cache memory of said main memory to said main memory prior to access in said selectively accessing step, providing physical addresses to data to be accessed in said main memory during said selectively accessing step and initiating a span interpolation by said free running span processor of respective data points on a span of said geometrically transformed input data.

17. A method as in claim 16, comprising the further steps of calculating, in parallel with said interpolating and address calculating steps, a number of pixels within a span to be displayed as a span count and discontinuing the interpolation for the present scan line when the span count has been reached.

\* \* \* \* \*

UNITED STATES PATENT AND TRADEMARK OFFICE
CERTIFICATE OF CORRECTION

PATENT NO. : 5,493,644
DATED : Feb. 20, 1996
INVENTOR(S) : Larry J. Thayer, Leon Sigal, Charles R. Dowdell It is certified that error appears in the above-indentified patent and that said Letters Patent is hereby corrected as shown below:

Col. 7, l. 54: Delete "processor" and insert therefor --pixel--

Col. 7, line 37, after "pixel's" insert --Z--

Col. 11, l. 46: Before "interpolation" insert --Z--

In the Claims:

Col. 14, Claim. 5, l. 9: After "interpolated" insert -- predetermined coordinate data in said predetermined--

Col. 14, Claim. 5, l. 10: After first occurrence of "said" insert --main--

Signed and Sealed this

Third Day of December, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,493,644
DATED : February 20, 1996
INVENTOR(S) : Thayer et al.

It is certified that error appears in the above-identified patent and that said Letters Patent is hereby corrected as shown below:

Title page,
Item [75], Inventors, please replace "Larry J. Thayer, Fort Collins; Leon Sigal, Denver; Charles R. Dowdell, Fort Collins, all of Colo." with -- Larry J. Thayer, Fort Collins; Leon Sigal, Denver; Charles R. Dowdell, Fort Collins; Robert J. Horning, Fort Collins, all of Colo. --

Signed and Sealed this

Twenty-second Day of February, 2005

JON W. DUDAS
*Director of the United States Patent and Trademark Office*